US006696815B1

United States Patent
Kikuchi

(10) Patent No.: US 6,696,815 B1
(45) Date of Patent: Feb. 24, 2004

(54) SECONDARY BATTERY CONTROL DEVICE AND CONTROL METHOD

(75) Inventor: Yoshiaki Kikuchi, Toyota (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 10/291,632

(22) Filed: Nov. 12, 2002

(30) Foreign Application Priority Data

Nov. 12, 2001 (JP) ........................................ 2001-345936

(51) Int. Cl.⁷ ............................... H02J 7/00; H02J 7/16
(52) U.S. Cl. ...................................... 320/104; 320/148
(58) Field of Search ................................. 320/104, 148, 320/128, 135, 137, 144, 147, 149, 153, 161, 162, 163

(56) References Cited

U.S. PATENT DOCUMENTS 5,625,272 A * 4/1997 Takahashi .................. 320/116
6,034,510 A * 3/2000 Kikuchi et al. ............ 320/148
6,104,164 A * 8/2000 Iino et al. ................... 320/116

FOREIGN PATENT DOCUMENTS

JP          8-140206 A      5/1996
JP          11-122840 A     4/1999

* cited by examiner

*Primary Examiner*—Pia Tibbits
(74) *Attorney, Agent, or Firm*—Kenyon & Kenyon

(57) ABSTRACT

A motor-generator is connected to a secondary battery via an inverter. The inverter is controlled by a hybrid (HV) ECU. A voltage sensor detects a voltage of each block of the secondary battery. A current value of the secondary battery is detected by a current sensor and supplied to a battery ECU. The battery ECU supplies the detected voltage to the HV ECU. The HV ECU compares the detected voltage against a predetermined threshold value at a high order of priority. If the detected voltage is the predetermined threshold value or lower, the HV ECU suppresses power consumption of the motor, thereby suppressing discharge of the secondary battery.

10 Claims, 4 Drawing Sheets

SECONDARY BATTERY CONTROL DEVICE AND CONTROL METHOD

The disclosure of Japanese Patent Application No. 2001-345936 filed on Nov. 12, 2002, including the specification, drawings and abstract is incorporated herein by reference in its entirety.

BACKGROUND OF THE INVENTION

1. Field of Invention

The invention relates to a control device and a control method for a secondary battery and, more particularly, to a discharge control of the secondary battery.

2. Description of Related Art

Electric vehicles, hybrid vehicles, and the like are equipped with a secondary battery. The hybrid vehicle is powered by, in addition to an engine, a motor that is driven by electricity supplied by the secondary battery. In addition, the hybrid vehicle has the motor function as a generator during braking, thereby transforming the kinetic energy of the vehicle into electric energy for recharging (regenerating) the secondary battery. The state of charge, i.e., SOC, of the secondary battery is therefore controlled in the range between 0% and 100%, for example, approximately 60%, so that the battery is in a state ready to receive regenerative electricity and, at the same time, the motor can be supplied with electricity immediately when required.

Depending on vehicle running conditions, however, the secondary battery may discharge a large amount of electricity, causing the SOC to become lower than a required level. Since deterioration of the secondary battery is accelerated when the battery discharges to a level of near 0% of SOC, it is necessary to stop the battery from discharging before the SOC reaches that critical level.

Japanese Patent Laid-Open Publication No. 11-122840, for example, discloses a secondary battery control device that detects a voltage of the secondary battery and, when the detected voltage becomes a predetermined threshold value or below, stops the secondary battery from discharging, thereby preventing the battery from deteriorating.

FIG. 4 shows a configuration block diagram of the secondary battery control device. A secondary battery 50 is divided into a plurality of blocks 50-1 to 50-n, each being connected in series with each other to form the secondary battery 50. Each of voltage sensors 70-1 to 70-n is connected to each of these blocks 50-1 to 50-n to monitor the voltage of the secondary battery 50. A current sensor 72 is provided in a current path of the secondary battery 50. In addition, a temperature sensor 74 is provided for detecting the temperature of the secondary battery 50. The values detected by the voltage sensors 70-1 to 70-n, the current sensor 72, and the temperature sensor 74 are supplied to a battery ECU 68. Furthermore, a relay 76 is provided in an electric power line connected to the secondary battery 50. The relay 76 functions to disconnect the secondary battery from an inverter that drives a motor which serves as a load.

The battery ECU 68 is provided with, as functional blocks thereof, a detecting portion 80, a determining portion 82, a memory 84, and a relay control portion 86. The detecting portion 80 supplies the voltage values, the current value, and the battery temperature value detected, respectively, by the voltage sensors 70-1 to 70-n, the current sensor 72, and the temperature sensor 74 to the determining portion 82 as digital data. Based on the detected battery temperature, the determining portion 82 reads out a voltage threshold value corresponding to the temperature from the memory 84. The determining portion 82 then compares the voltage threshold value with each of the detected voltage values of blocks 50-1 to 50-n of the secondary battery 50. If any one of these detected voltage values is the threshold value or lower, that is, if the lowest voltage value of these detected voltage values of the blocks is the threshold value or lower, the determining portion 82 supplies the result of this comparison to the relay control portion 86. Based on this result, the relay control portion 86 opens (turns OFF) the relay 76, thereby disconnecting the secondary battery 50 from the inverter. This stops the secondary battery 50 from discharging any further, thus preventing it from deteriorating.

There is known another technique that is not concerned with turning ON or OFF the relay 76 as described in the foregoing paragraphs. Instead, if the battery ECU 68 determines that the voltage of the secondary battery 50 is the threshold value or lower, it sends that result to an ECU for controlling the entire system which may be, for example, a hybrid (HV) ECU that controls the engine and the inverter. The HV ECU then controls the inverter so as to restrict an output from the motor, thereby controlling a voltage drop in the secondary battery 50. While turning OFF the relay stops the operation of the motor all of a sudden which may cause driveability degradation, controlling the inverter to reduce power consumption of the motor can suppress an effect on driveability and at the same time can prevent overdischarge of the secondary battery 50.

In addition to controlling the inverter based on the result of the determination supplied by the battery ECU 68, the HV ECU executes, preferentially over the inverter control, an engine control based on an acceleration operation, brake operation, or the like and a motor control based on the SOC of the secondary battery 50. Processing of the inverter control based on the result of the determination supplied by the battery ECU 68 is given a low order of priority. This could present a new problem, in which the voltage of the secondary battery 50 becomes lower than the threshold value as a result of a control lag of the inverter. If, on the other hand, a setting is made to allow a sufficient margin for the lowest voltage so as not to let the voltage become lower than the threshold value, electricity charged in the secondary battery can be used only insufficiently. The same holds true with a case in which consideration is given to prevent an excessive rise in voltage when recharging the secondary battery.

Assume, for example, that the battery ECU 68 operates at a rate of 100 ms, while the HV ECU operates at 8 ms. The battery ECU 68 detects a voltage at 100 ms, i.e., receives a signal of the detected voltage, compares it against the threshold value, and supplies the result of the comparison to the HV ECU. The HV ECU does not, however, process the data of the detected voltage value at 8 ms. Rather, HV ECU operates to control the inverter after the lapse of a period of 300 ms or more, since processing of the data is given a low order of priority. As motor keeps operating during this period of time, there arises a problem of a further voltage drop in the secondary battery 50.

SUMMARY OF THE INVENTION

It is an object of the invention to provide a secondary battery control device that is capable of preventing a voltage drop in a secondary battery by promptly processing data of a detected voltage value and thereby suppressing deterioration of the secondary battery.

A first aspect of the invention relates to a secondary battery control device. The secondary battery control device is provided with: a voltage detector that detects a voltage of the secondary battery; a first controller that receives at every predetermined period of time a value representing the voltage detected by the voltage detector and controls the secondary battery; and a second controller that receives the detected voltage from the first controller, determines within a period of time shorter than the predetermined period of time whether or not the received voltage is greater than a predetermined threshold value, and, based on the result of determination made, controls recharge or discharge of the secondary battery.

As explained above, in the secondary battery control device according to the first aspect of the invention, the first controller receives the voltage value of the secondary battery at every predetermined period of time, and the second controller controls recharge or discharge of the secondary battery at every period of time shorter than the predetermined period of time. This arrangement makes it possible to control the secondary battery promptly. Therefore, the secondary battery control device can control the amount of discharge or the amount of recharge of the secondary battery.

A second aspect of the invention relates to a secondary battery control method. The method includes the steps of detecting a voltage of the secondary battery at every predetermined period of time; determining within a period of time shorter than the predetermined period of time whether or not the detected voltage value is greater than a predetermined threshold value; and controlling recharge or discharge of the secondary battery based on the result of the determination made.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

An exemplary embodiment according to the invention will be described with reference to accompanying drawings.

Figure 1:
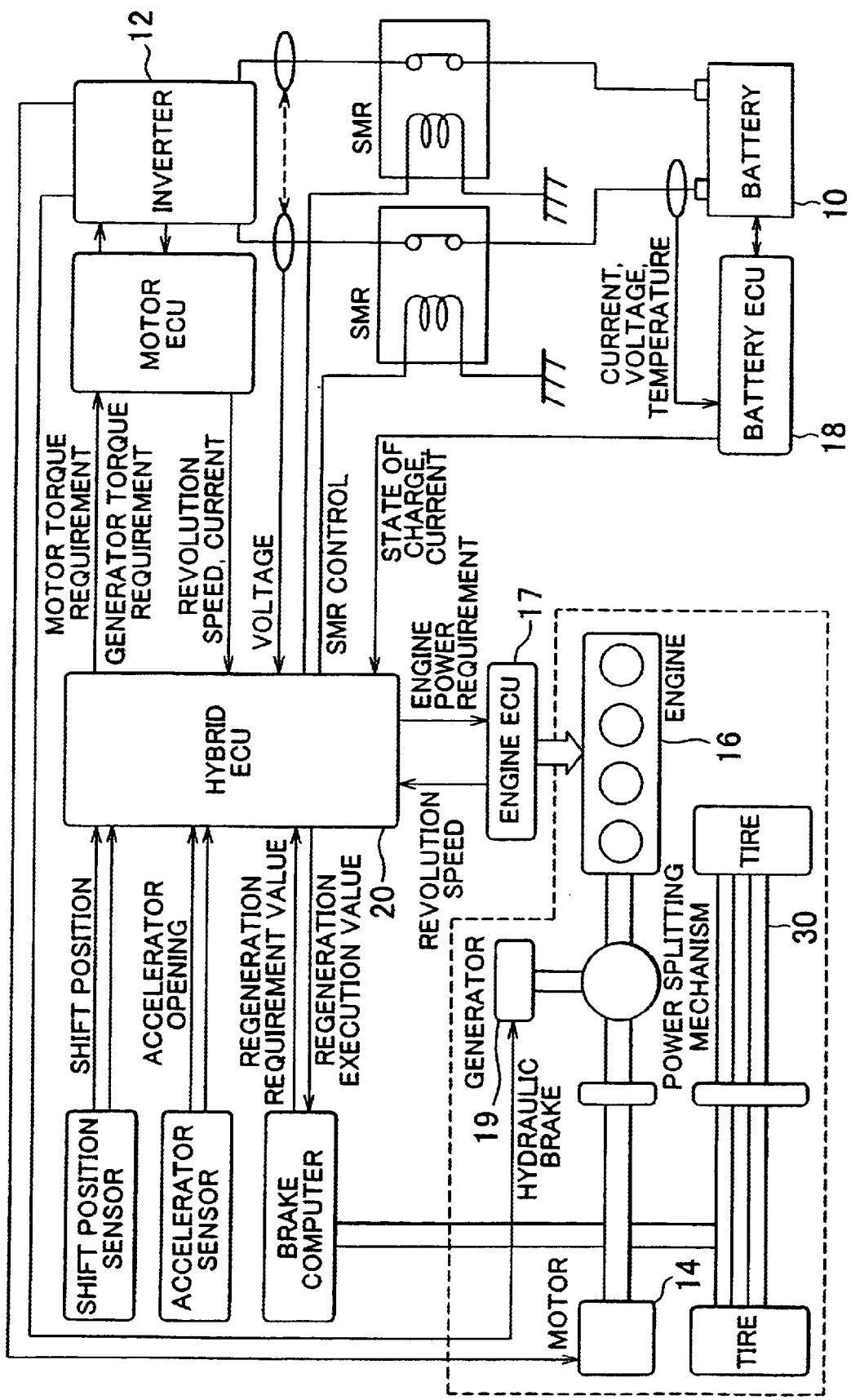
FIG. 1 shows a configuration block diagram of a hybrid vehicle according to an exemplary embodiment of the invention.
Figure 3:
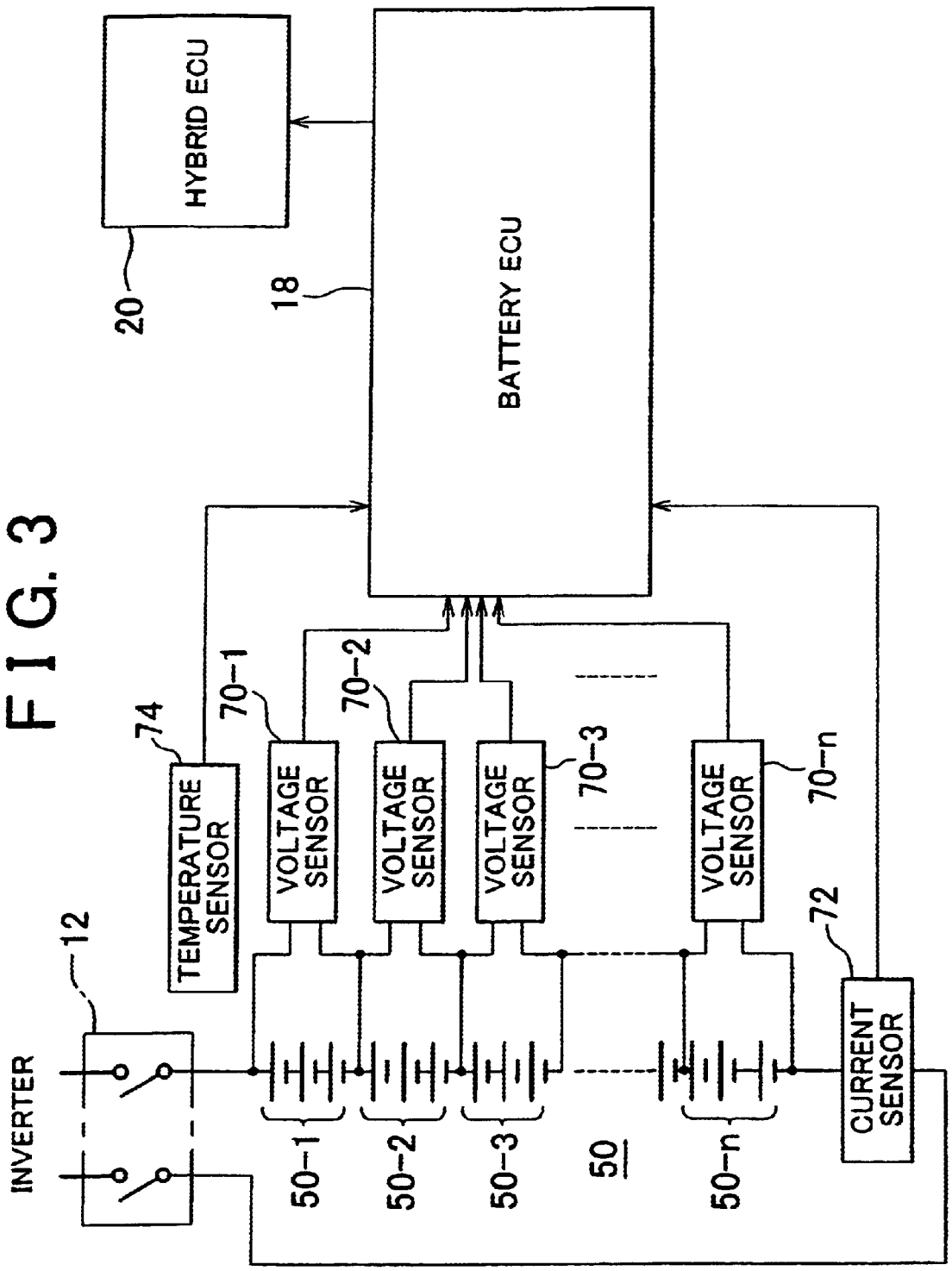
FIG. 3 shows a configuration block diagram of a secondary battery control device according to the exemplary embodiment of the invention.
Figure 4:
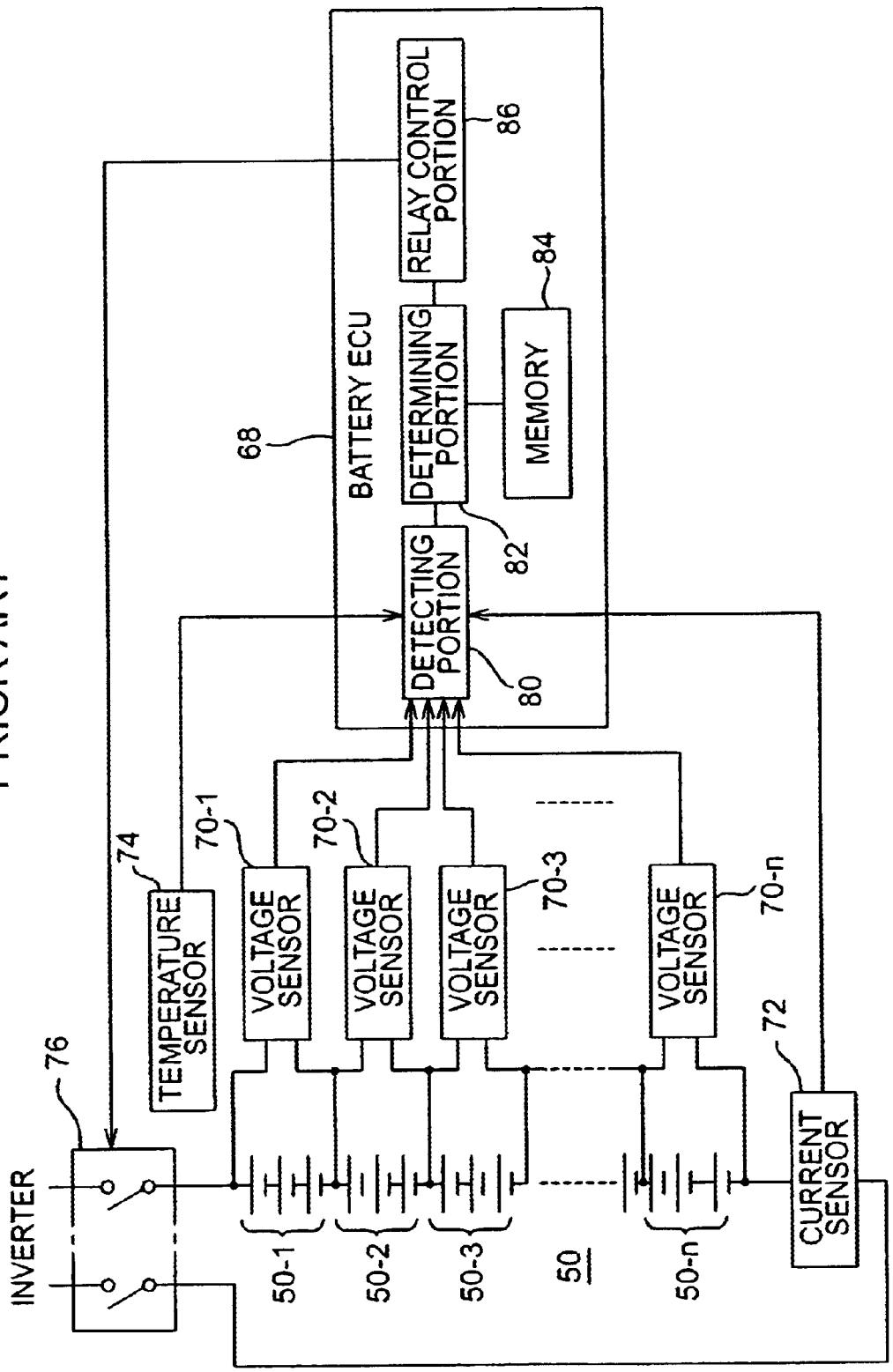
FIG. 4 shows a configuration block diagram of a device according to the related art.

FIG. 1 shows a configuration block diagram of a hybrid vehicle provided with secondary battery control means according to the exemplary embodiment of the invention. An overall configuration of the secondary battery control device is shown in FIG. 3. The construction of the secondary battery control device is substantially the same as that of the device shown in FIG. 4. Therefore, the same reference numerals are used to refer to the same component elements, thereby omitting descriptions thereof. Referring to FIG. 1, a vehicle is provided with a motor-generator (MG) 14 and an engine 16. The motor-generator 14 and the engine 16 are connected through a power splitting mechanism, such as a planetary gear train or the like. One shaft of the power splitting mechanism is connected to a drive shaft 30, to which a driving wheel is coupled. This allows an output from the motor-generator 14 or the engine 16 to be transmitted to the drive shaft 30, thus driving the vehicle.

An engine ECU 17 controls an output, a revolution speed, and the like of the engine 16 based on an operated stroke of an accelerator pedal detected by an accelerator sensor, environmental conditions including a coolant temperature and an operating condition of the motor-generator 14. The motor-generator 14 is controlled by a hybrid (HV) ECU 20. The HV ECU 20 controls each of switches of an inverter 12, thereby supplying electricity from a secondary battery (battery) 10 to the motor-generator 14, or using electricity from the motor-generator 14 to recharge the secondary battery 10. The secondary battery 10 and the inverter 12 are connected through a system main relay SMR. Control of the inverter 12 by the HV ECU 20 is executed based on information such as the information on an operating condition of the engine 16 supplied from the engine ECU 17, the operated stroke of the accelerator pedal supplied from the accelerator sensor, the operated stroke of a brake pedal supplied from a brake computer, a shift range detected by a shift position sensor, the state of charge SOC of the secondary battery 10 supplied from a battery ECU 18, and the like.

As described above, a plurality of blocks are connected in series to the secondary battery 10, each of these blocks being composed of a plurality of cells. Each block is provided with a voltage sensor that supplies the battery ECU 18 with a voltage detected thereof. A current value of the secondary battery 10 detected by a current sensor 72 is also supplied to the battery ECU 18. The battery ECU 18 executes a temperature control for the secondary battery 10 based on the temperature detected by a temperature sensor 74. Upon detecting a temperature of a predetermined value or more, the battery ECU 18 drives a cooling fan (not shown) so as to keep the temperature of the secondary battery 10 constant. Furthermore, the battery ECU 18 uses the detected current value to determine the state of charge (SOC) of the secondary battery 10 and supplies that information to the HV ECU 20. The SOC is calculated based on an initial SOC and a cumulative value of current discharged from and recharged to the secondary battery 10. The calculated SOC is supplied to the HV ECU 20 as described above.

The battery ECU 68 explained in the description of related art compares the lowest value of the detected voltage values of blocks 50-1 to 50-n against the predetermined threshold value. If it is determined that the lowest voltage value of these detected voltage values of the blocks 50-1 to 50-n is the threshold value or lower, the battery ECU 68 supplies the data of the result of the determination to the HV ECU 20. The HV ECU 20 receives this data during ordinary processing routines and, according to a relatively low order of priority, controls the inverter 12 based on the data, thereby reducing power consumption of the motor 14. According to the exemplary embodiment of the invention, however, the battery ECU 18 receives the voltage value of each block at predetermined control intervals, for example, at every 100-ms period. The battery ECU 18 supplies the detected voltage value directly to the HV ECU 20 at predetermined control intervals, for example, at every 100-ms period. The HV ECU 20 compares the lowest voltage value against a predetermined threshold value at predetermined control intervals, for example, at every 8-ms period. If the lowest value is the threshold value or lower, the HV ECU 20 immediately controls the inverter 12 in order to suppress power consumption of the motor 14. Since the battery ECU 18 detects the lowest value of the detected voltage values at the control interval of 100 ms, the HV ECU 20 can control the inverter 12 at a rate substantially the same as this control interval. As a result, the voltage of the secondary battery 10 dropping significantly below the threshold value due to a control lag can be prevented.

Figure 2:
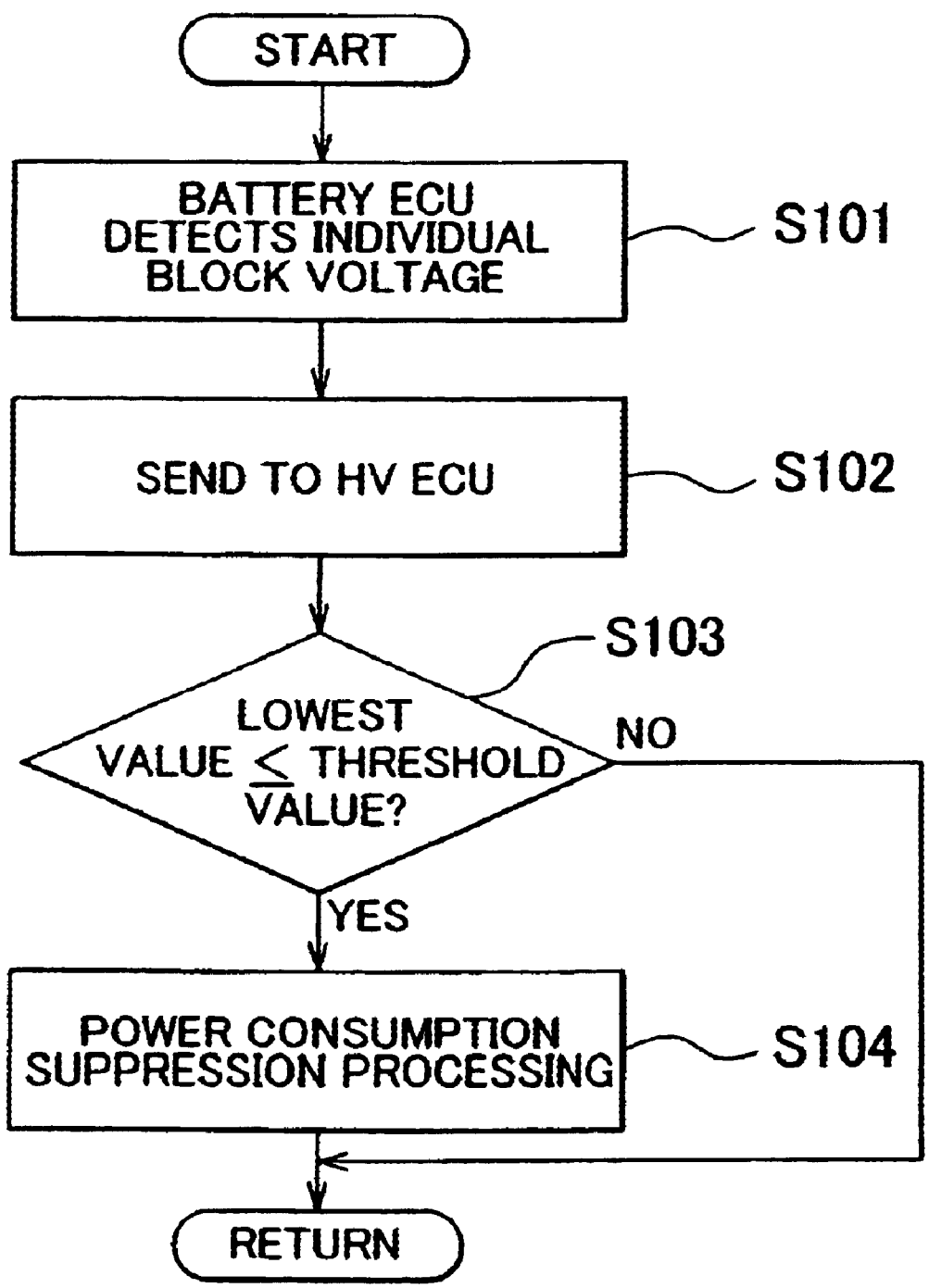
FIG. 2 is a processing flowchart a according to the exemplary embodiment of the invention.

FIG. 2 shows a processing flowchart according to the exemplary embodiment of the invention. The battery ECU 18 receives an input of the voltage of each of blocks 50-1 to 50-n of the secondary battery 10 and detects the lowest voltage value of all these voltage inputs (S101). It detects the lowest voltage at intervals of, for example, 100 ms. After having detected the voltage values of blocks 50-1 to 50-n, the battery ECU 18 transmits the voltage data to the HV ECU 20 (S102).

The HV ECU 20 calculates required engine output and motor torque based on an accelerator opening and a shift position. It then outputs command values corresponding to the required engine output and motor torque to a motor ECU in order to control the inverter 12. At the same time, the HV ECU 20 compares the lowest value of the voltage values from the battery ECU 18 against the predetermined threshold value stored in a memory at predetermined control intervals (for example, every 8-ms period) (S103). The threshold value can be set to a value higher by an allowance than a lower limit voltage value of the secondary battery 10. The threshold value stored in the memory may be based on a voltage of an entire secondary battery. In this case, the threshold value to be compared with the lowest value can be calculated by the following equation: the voltage threshold value (per a block of the secondary battery)×the number of blocks of the secondary battery. Furthermore, the threshold value corresponding to each of different temperatures can be stored in the memory and the threshold value corresponding to the detected temperature may be read from the memory. The threshold value data corresponding to each of different temperatures can be updated at the same interval (100 ms) at which the battery ECU 18 detects the lowest voltage.

If the HV ECU 20 determines that the detected lowest value is the threshold value or lower on the basis of the comparison, it immediately controls the inverter 12 to suppress discharge from the secondary battery 10 so as to suppress power consumption of the motor 14 (S104). It goes without saying that the secondary battery 10 can be stopped from discharging by deactivating the inverter 12. On the other hand, in a case that the detected lowest value exceeds the threshold value, the HV ECU 20 activates the inverter 12 so as to obtain a required motor torque. It thereby allows the secondary battery 10 to supply electricity to the motor 14 in order to drive the motor 14.

As described above, the HV ECU 20 executes the process of comparing the lowest voltage value against the predetermined threshold value, and the detected voltages from the battery ECU 18 are processed with the order of priority higher than that of engine control and motor control. Therefore, according to the exemplary embodiment of the invention, it is possible to promptly control the inverter 12 based on the voltage of the secondary battery 10 as compared with a case in which a priority equivalent to that given to the engine control and motor control is given to the inverter control. The exemplary embodiment can therefore prevent a voltage drop occurring in the secondary battery 10 as a result of a control lag of the inverter 12.

According to the exemplary embodiment of the invention, discharge of the secondary battery 10 is suppressed by controlling the inverter 12. It is nonetheless possible to provide a relay in an electric power line between the secondary battery 10 and the inverter 12. The relay may be controlled to open in order to stop the discharge of the secondary battery 10, when the lowest value among the voltage values of blocks 50-1 to 50-n becomes the threshold value or lower.

Furthermore, according to the exemplary embodiment of the invention, the battery ECU 18 detects voltages of each block and supplies them to the HV ECU 20. A first threshold value and a second threshold value (the first threshold value>the second threshold value) may be provided as the voltage threshold value. In this case, processing may proceed as follows. Namely, in a range over which the lowest value of detected voltages exceeds the first threshold value, the battery ECU 18 compares the lowest voltage value against a threshold value and supplies the result of this comparison to the HV ECU 20. The HV ECU 20 then processes this data with the order of priority lower than that given to motor control and engine control. Then as soon as the lowest voltage value becomes the first threshold value or lower, the battery ECU 18 supplies the detected voltage value directly to the HV ECU 20. Furthermore, processing may also be such that the HV ECU 20 compares, based on the detected voltage values, the lowest detected voltage against the second threshold value with the priority equivalent to that given to motor control and engine control, thereby controlling the inverter 12.

One of the methods for controlling discharge of the secondary battery, is to control ON/OFF operation of relay means which is provided between the secondary battery and a load such as a motor. Another method is to control inverter operation so as to suppress power consumption of the motor which serves as the load. The latter method would be preferable from the viewpoint of driveability.

The secondary battery according to the exemplary embodiment of the invention can be mounted on the electric vehicle, hybrid vehicle, a fuel cell vehicle, and the like.

It should be understood that modifications may be made without departing from the spirit and scope of the invention, as long as the HV ECU 20 capable of high-speed data processing is used to control power consumption of the motor 14 based on the comparison made between the lowest voltage value of the secondary battery 10 and the threshold value as soon as the voltage of the secondary battery 10 nears the lower limit value.

What is claimed is:

1. A control device for a secondary battery, comprising:
   a voltage detector that detects a voltage of the secondary battery;
   a first controller that receives at every predetermined period of time a value representing the voltage detected by the voltage detector and controls the secondary battery; and
   a second controller that receives the detected voltage value from the first controller, determines within a period of time shorter than the predetermined period of time whether the received value is grater than a predetermined threshold value, and, based on the result of the determination made, controls recharge or discharge of the secondary battery.

2. The control device according to claim 1,
   wherein the second controller receives the detected voltage value from the first controller at intervals shorter than the predetermined period of time.

3. The control device according to claim 1, further comprising:
a load connected to the secondary battery, wherein the second controller controls the load, and control of recharge or discharge of the secondary battery is executed with an order of priority equivalent to that given to the control of the load.

4. The control device according to claim 3,
wherein a cycle at which the second controller determines whether the received value is greater than a predetermined threshold value is equivalent to a cycle at which the control of the load is executed.

5. The control device according to claim 3,
wherein the secondary battery is composed of a plurality of blocks that are connected in series with each other, the voltage detector detects the voltage of each of the plurality of blocks, and the second controller controls the load so as to suppress power consumption of the load when a lowest value of voltages detected for each of the blocks becomes the first predetermined threshold value or lower.

6. The control device according to claim 3,
wherein the load is a motor connected to an inverter, and the second controller controls the motor by controlling the operation of the inverter.

7. The control device according to claim 3,
wherein the load is a motor connected to the secondary battery through a relay, and the second controller controls to open or close the relay based on the result of the determination made.

8. The control device according to claim 1,
wherein the secondary battery can be mounted in at least one of an electric vehicle, a hybrid vehicle, and a fuel cell vehicle.

9. The control device according to claim 1, wherein the second controller has a data processing rate faster than that of the first controller.

10. A secondary battery control method, comprising:
detecting a voltage of the secondary battery at every predetermined period of time;
determining within a period of time shorter than the predetermined period of time whether the detected voltage value is greater than a predetermined threshold value; and
controlling recharge or discharge of the secondary battery based on the result of the determination made.

* * * * *